(12) United States Patent
Cowan et al.

(10) Patent No.: US 9,792,841 B2
(45) Date of Patent: Oct. 17, 2017

(54) INTERLOCKING SCINTILLATING DISPLAY PANELS AND METHOD OF USE

(71) Applicants: Samuel Mark Cowan, Rock Springs, WY (US); Roman Zenon Shwed, Coconut Creek, FL (US); Lindsay Cowan, Rock Springs, WY (US)

(72) Inventors: Samuel Mark Cowan, Rock Springs, WY (US); Roman Zenon Shwed, Coconut Creek, FL (US); Lindsay Cowan, Rock Springs, WY (US)

( * ) Notice: Subject to any disclaimer, the term of this patent is extended or adjusted under 35 U.S.C. 154(b) by 438 days.

(21) Appl. No.: 14/321,411

(22) Filed: Jul. 1, 2014

(65) Prior Publication Data
US 2015/0003905 A1 Jan. 1, 2015

Related U.S. Application Data

(60) Provisional application No. 61/841,774, filed on Jul. 1, 2013.

(51) Int. Cl.
*G09F 13/16* (2006.01)
*G09F 7/06* (2006.01)
*F16B 5/00* (2006.01)
*F16B 21/06* (2006.01)

(52) U.S. Cl.
CPC .............. *G09F 7/06* (2013.01); *F16B 5/0056* (2013.01); *F16B 21/06* (2013.01); *Y10T 403/7039* (2015.01)

(58) Field of Classification Search
CPC ...... F16B 21/06; F16B 5/0056; F16B 5/0258; E04F 15/105; E04F 15/02194; G09F 7/06
See application file for complete search history.

(56) References Cited

U.S. PATENT DOCUMENTS

| | | | | |
|---|---|---|---|---|
| 770,931 A * | 9/1904 | Seary | ................. | G09F 7/22 40/583 |
| 2,912,778 A * | 11/1959 | Battaglia | ................. | G09F 13/16 40/613 |
| 2,969,606 A * | 1/1961 | Battaglia | ................. | G09F 13/16 40/613 |
| 3,043,039 A * | 7/1962 | Battaglia | ................. | G09F 13/16 40/613 |
| 3,166,863 A * | 1/1965 | Gray | ................. | G09F 13/16 24/700 |
| 3,189,183 A * | 6/1965 | Thrasher | ................. | G09F 7/22 211/13.1 |
| 3,202,288 A * | 8/1965 | Thrasher | ................. | G09F 13/16 211/13.1 |
| 3,206,882 A * | 9/1965 | Thatcher | ................. | G08B 5/00 156/292 |
| 3,260,372 A * | 7/1966 | Jauslin | ................. | G09F 13/16 211/13.1 |
| 3,298,123 A * | 1/1967 | Ownbey | ................. | G09F 13/16 40/583 |
| 3,766,668 A * | 10/1973 | Vogel | ................. | G09B 1/06 434/403 |
| 4,017,992 A * | 4/1977 | Kajitani | ................. | G09F 13/16 40/439 |

(Continued)

*Primary Examiner* — Daniel Wiley
(74) *Attorney, Agent, or Firm* — J. Todd Rushton

(57) ABSTRACT

Scintillating display panels having a plurality of display element posts formed on the top surface and integrated interlocking couplings formed in the edge margins of each display panel.

6 Claims, 7 Drawing Sheets

(56) References Cited

U.S. PATENT DOCUMENTS

| | | | | |
|---|---|---|---|---|
| 4,080,747 A * | 3/1978 | Kato | ................... | G09F 13/165 40/439 |
| 4,146,976 A * | 4/1979 | Zambiasi | ................... | G09F 7/06 40/600 |
| 4,167,599 A * | 9/1979 | Nissinen | ............ | A47G 27/0225 4/581 |
| 4,253,268 A * | 3/1981 | Mayr | ................... | A63H 33/042 16/224 |
| RE30,822 E * | 12/1981 | Kato | ................... | G09F 13/165 40/613 |
| 4,308,680 A * | 1/1982 | Aboudi | ................... | G09F 13/16 40/447 |
| 4,436,779 A * | 3/1984 | Menconi | ............... | E01C 13/045 404/41 |
| 4,468,910 A * | 9/1984 | Morrison | ............. | A01K 1/0157 404/36 |
| 4,590,731 A * | 5/1986 | DeGooyer | ............... | E04C 5/04 52/388 |
| 4,728,468 A * | 3/1988 | Duke | ................... | B01J 19/32 261/111 |
| 4,761,315 A * | 8/1988 | Logan | ................... | B24B 9/146 33/200 |
| 4,807,412 A * | 2/1989 | Frederiksen | ....... | A47G 27/0212 52/177 |
| 5,323,575 A * | 6/1994 | Yeh | ................... | E04F 21/1844 52/177 |
| 5,509,244 A * | 4/1996 | Bentzon | ................. | E01C 5/005 428/44 |
| 6,089,784 A * | 7/2000 | Ardern | .................... | E01C 9/08 403/375 |
| 6,098,354 A * | 8/2000 | Skandis | .................. | E01C 5/20 52/177 |
| 6,221,298 B1 * | 4/2001 | Ferreira | ............... | B29C 39/023 264/243 |
| 7,908,802 B2 * | 3/2011 | Frederiksen | ............. | E01C 5/20 52/177 |
| 8,266,849 B2 * | 9/2012 | Bravo | ................... | E04F 15/043 52/177 |
| 8,266,857 B2 * | 9/2012 | David | ..................... | B44C 1/28 428/192 |
| 8,646,242 B2 * | 2/2014 | Shapiro | .................. | E04F 15/10 52/506.1 |
| 8,651,770 B2 * | 2/2014 | Lancaster | .............. | E02B 3/122 405/16 |
| 8,834,058 B2 * | 9/2014 | Woicke | ................... | B01J 19/32 24/662 |
| 2009/0266022 A1* | 10/2009 | Lin | ......................... | E04F 15/10 52/506.1 |
| 2011/0287207 A1* | 11/2011 | Shwed | ................... | G09F 13/165 428/53 |
| 2012/0182207 A1* | 7/2012 | Cowan | ..................... | G09F 7/06 345/55 |
| 2014/0325924 A1* | 11/2014 | Schuster | ........... | E04F 15/02038 52/177 |

* cited by examiner

SECTION AA

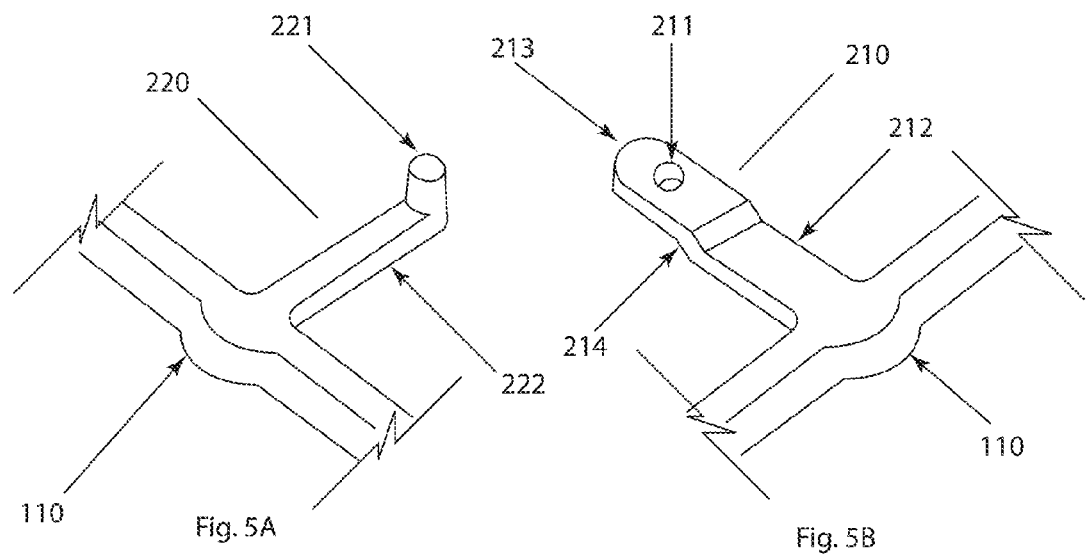
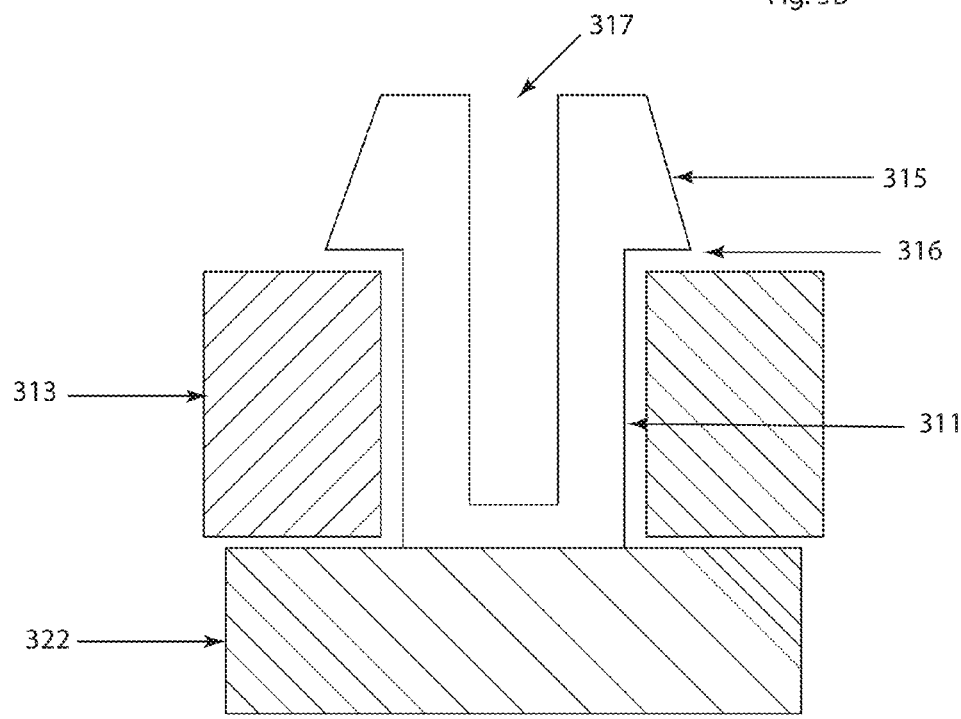

SECTION AA

INTERLOCKING SCINTILLATING DISPLAY PANELS AND METHOD OF USE

This application is related to Non-Provisional patent application Ser. No. 12/784,354, REFLECTIVE DECORATIVE ASSEMBLY, Filed May 20, 2010 and Non-Provisional patent application Ser. No. 13/032,767, HIGH RESOLUTION SCINTILLATING DISPLAY AND METHOD OF USE, Filed Feb. 23, 2011, the complete disclosure of the abovementioned applications incorporated by reference.

BACKGROUND

Creating a display having a fluid surface or a scintillating effect can involve myriad components and repeated steps; to complete the process, the user must affix a plurality of individual posts or a plurality of panels to a base surface for the display and then attach a graphic media, such as Mylar® discs to each of the posts to achieve the desired effect. It is typical that the panels are attached to the base surface using staples, wires or affixed using an adhesive, such as, a double sided or "double sticky" tape. Using panels having a plurality of posts in a uniform pattern alleviates alignment issues or spacing issues that may occur between the posts, at least for the areas that are covered by the individual panels. However, depending on the contours or uniformity of the base surface, it may be a problem to properly align the edges of an individual display panel against the other adjacent panels. This misalignment may create an unwanted, or visually unappealing, gap between individual display elements and may make assembly difficult, or impossible, if the individual display elements are formed in a pre-printed and scored sheet designed to be placed over the display panel posts, attached, and having the waste margin material removed to liberate the individual display elements after the elements are secured to the posts. In prior embodiments of the scintillating display panels, clips having four pins are used to connect corresponding panels together at the corner where a corresponding receiver or socket is formed. In other embodiments it is contemplated to use individual clips that overlap panel frame elements that have been butted up against one another. In practice, the panels may be attached together using an number of preformed clips or the panels may be attached using improvised methods including wiring, taping and using a variety of wire ties or zip ties. Providing independent clips represents a costly manufacturing step. The independent clips also force a user to keep and handle a plurality of clips during the install.

Another issue that may arise when attaching the individual display panels is planner alignment when connecting individual panels around corners or a rounded surface. Past embodiments of clips are configured to keep adjacent panels in a substantially even plane and are not adapted to allow connections where panels come to a corner forming either an acute or obtuse angle; forcing the user or technician to create an improvised connection at these points. This issue arises when a user may desire to wrap a column or a post with a fluid display surface.

What is need are scintillating display panels have integrated clips to eliminate manufacture and handling of individual clips or reduce the need for improvised attachments. At least one embodiment of the integrated clips allowing adjacently attached display elements to be bent or manipulated out of a planer configuration.

SUMMARY OF THE INVENTION

The present invention is related to scintillating display panels having integrated interlocking couplings formed in the edge margins of each display panel. The integrated interlocking couplings eliminate the manufacturing time and cost associated with the individual couplings, they also relieve the user of the repeated step of handing each individual coupling and may provide a safety benefit of freeing the technicians hands and attention during an install.

One embodiment of the present invention or interlocking scintillating display panels and method of use includes a substantially flat panel formed as a plurality of ribs or bars uniformly spaced within a square frame. One or more cross-braces formed perpendicular to the plurality of ribs. Display element pegs or posts are formed in a uniform pattern on the top surface of the plurality of the ribs and the square frame. A reciprocal set of a pin and socket are formed on each edge of the square frame. When panels are aligned adjacent one another, the pin feature of one panel may be inserted into the socket feature of the second panel. In one embodiment, the pin feature and the socket feature are attached to cantilevered tabs that extend away from the square frame. The length of the tabs configured to provide uniform spacing of the display element posts. In another embodiment of the present invention the tab of for the socket portion of the interlocking connection has a bend or an offset to allow adjacent panels to maintain a substantially planer configuration.

Another embodiment of the present invention or interlocking scintillating display panels includes display panels having a substantially planer base formed as a sheet in the shape of a square and a plurality of display element posts uniformly attached to the top surface of the sheet. Again a reciprocal set of pin and socket are formed on each edge of the square. This confirmation allows display panels to be interlocked together in a substantially planer orientation and affixed the surface of the area being ornamented using a double sided tape. One embodiment includes solid interlocking display panels having an adhesive backing which is pre-applied to the back of the panels and protected with a removable cover sheet comprised of a paper, treated paper or plastic. In yet another embodiment, the solid panels include score lines where the panels can be separated or snapped into smaller panels. The score line may be a mechanical cut or a preform recess in the shape of a "v".

In one embodiment of the present invention it is contemplated that the individual interconnecting pins are configured to provide a mechanical connection with the reciprocal socket. This arrangement may be advantageous in areas subject to human traffic that may touch or interfere with the display or may provide an added measure of display integrity when subject to adverse weather conditions such as rain, snow or wind. Each individual pin may be configured to include a tapered head to aid aligning the pin with the reciprocal socket and to compress a relief slot when the pin is pressed into the socket. The length of the pin such that it will extend all the way through the tab material and allow the pin relief to reopen and a shoulder formed under the tapered head to engage the back surface of the socket. This arrangement will in most cases provide a permanent attachment, however, the pin may be released by squeezing the taper portion together using pliers or a removal tool may also be provided. The removal tool, when placed over the tapered pin head, would compress the relief slot and push the pin back through the reciprocal socket.

In yet another embodiment of the present invention the reciprocal interlocking features attached to the edge of the square display panels may be formed as a ball and socket arrangement. The ball and socket interlocking connectors are attached of the square display panels in reciprocal sets.

The ball portion is formed as a substantially spherical structure on the end of support or post extending away from the edge of the display panel. In one embodiment, the socket portion may be formed as a cup or socket, having an opening substantially planer with the top surface of the display panel, equal to the diameter of the corresponding spherical ball however, the volume of the socket includes a plane that is slightly above a line representing a hemisphere or half of the spherical ball. This arrangement will create a slight overlap or interference when the ball is pressed into the socket. A relief slot is cut into the socket that will allow the socket to expand and release back over the ball and will also allow the post attaching the ball to pivot into slot when adjacent panels are aligned perpendicular with each. The length of the release slot will determine the possible offset or angle adjacent panels can be manipulated. In another embodiment of the present invention it contemplated the socket feature will have an opening that is perpendicular to the top surface of the display panel. This allows display panels to be pushed together on edge. However it is recognized that in this embodiment it would be necessary to provide relief slots on two sides of the sockets aligned along a vertical axis.

BRIEF DESCRIPTION OF DRAWINGS

The following description of the embodiments can be understood in light of the Figures, which illustrate specific aspects of the embodiments and are part of the specification. Together with the following description, the Figures demonstrate and explain the principles of the embodiments. In the Figures the physical dimensions of the embodiment may be exaggerated for clarity. The same reference numerals in different drawings represent the same element, and thus their descriptions may be omitted.

FIG. 5A, is one embodiment of an interlocking pin,

FIG. 5B, is one embodiment of an interlocking socket,

FIG. 5C, is a section view of one embodiment of a reciprocal pin and socket,

DETAIL DESCRIPTION OF THE DRAWINGS

Figure 1:
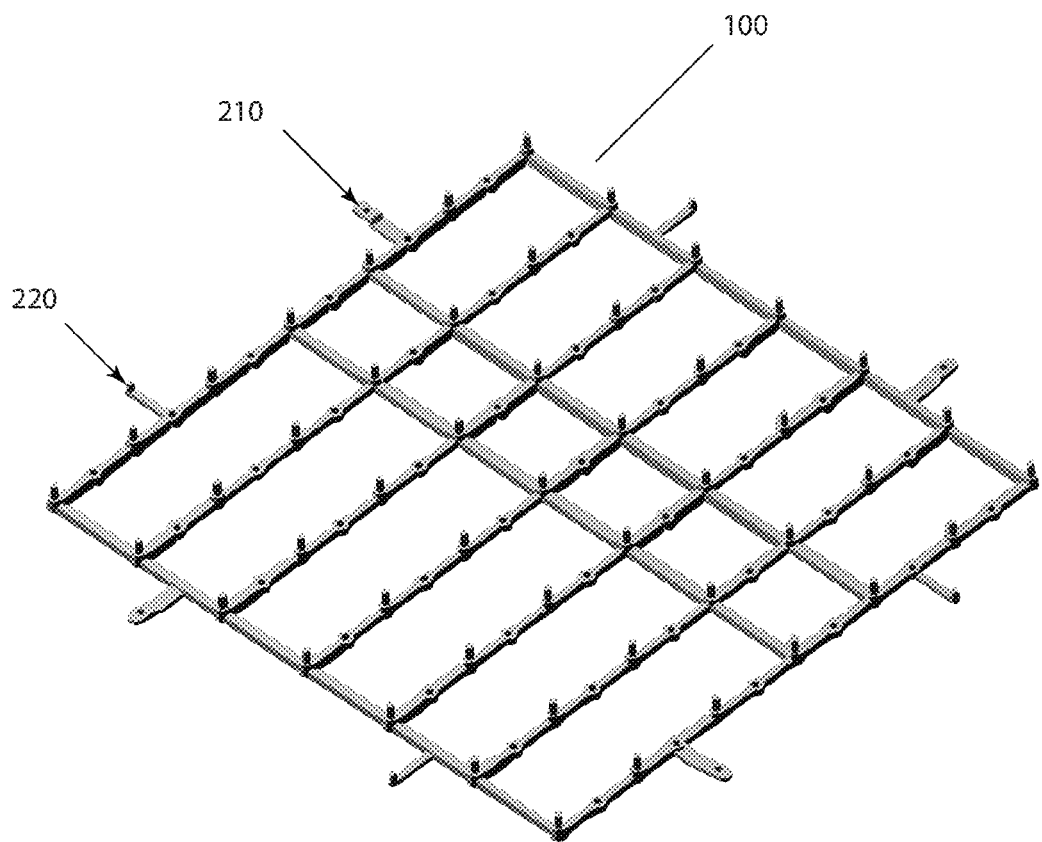
FIG. 1, is an interlocking display panel with open bracing.
Figure 2:
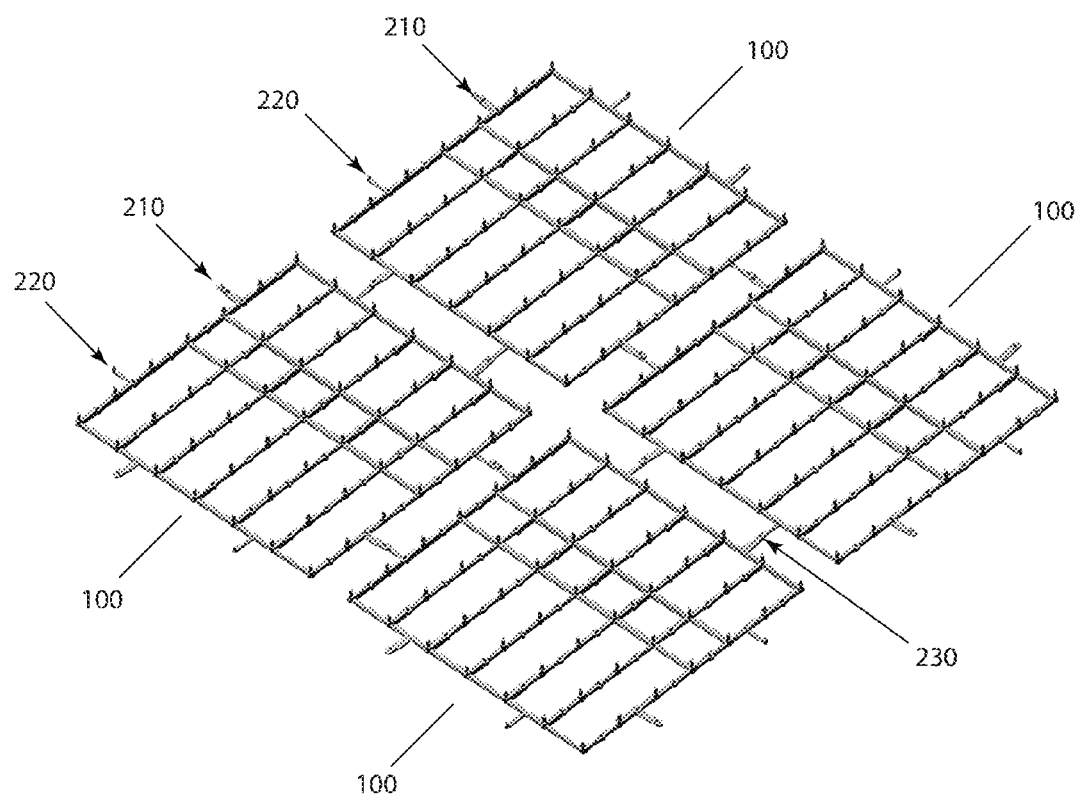
FIG. 2, is a plurality of interlocked display panels with open bracing.

FIGS. 1 and 2 are one embodiment of the present invention, or interlocking scintillating display panels and method of use, including the display panel 100 having reciprocal sets of interlocking connectors including socket 220 and pin 210. As shown in FIG. 2, a plurality of panels 100 are interlocked using socket 220 and pin 210 in a mated union 230.

Figure 3A:
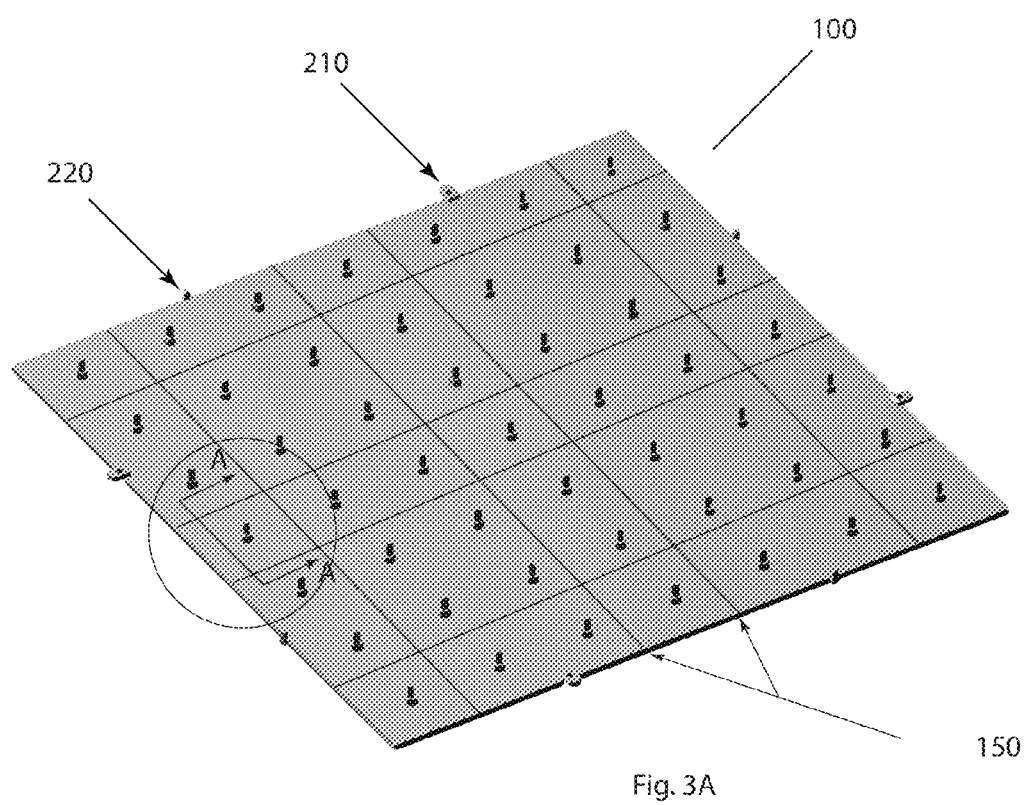
FIG. 3A, is a solid interlocking display panel.
Figure 3B:
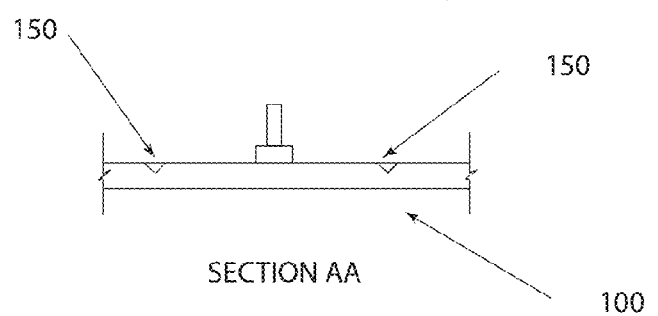
FIG. 3B, is a section of the solid interlocking display panel.
Figure 4:
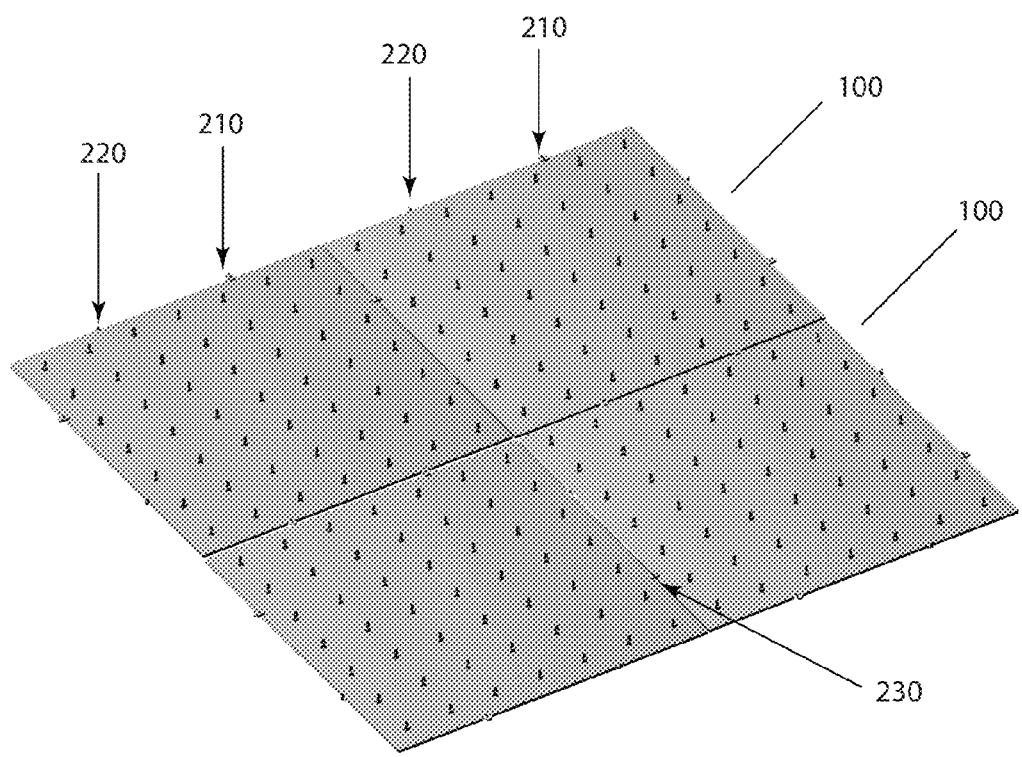
FIG. 4, is a plurality of solid interlocking display panels.

FIGS. 3A, 3B, and 4 are another embodiment of the present invention including a solid display panel 100 with reciprocal pin 210 and socket 220. Score lines 150 allow a user to break or "snap" the solid display panel 100. Score line 150, as shown in FIG. 3B, may be a molded groove in the form a "v" or another recessed shape, or may be a simple cut or score pressed into the panel following the molding process. FIG. 4 depicts a plurality of display panels 100 in an interlocked configuration, including pin 210 and socket 220 in a mated union 230.

FIGS. 5A and 5B represent on embodiment of a reciprocal set of interlocking connectors including the socket 210 and pin 220. Socket 210 including an aperture configured to snugly accept pin 210. In one embodiment the engagement may be accomplished wherein the aperture 211 of the socket 210 and pin 220 are substantially cylindrical having parallel sides. In another embodiment pin 220 has a frustoconical shape or is tapered to create a progressive interference fit with socket 210. Socket 210 extends away from the display panel frame 110 on a cantilever tab 212 having the aperture 210 and rounded free end 213. In one embodiment the cantilevered tab 212 is substantially straight, in yet another embodiment the cantilevered tab 212 including an offset or bend 214, allowing better alignment between display panels 100. Pin 221 of pin assembly 220 is cantilevered away from the frame 110 by tab portion 222.

FIG. 5C is one embodiment of the pin assembly having a pin 311 and reciprocal socket 313. Pin 311 including a tapered top portion 315 to aid alignment with the aperture of socket 313 and to compress relief slot 317. When pin 311 is extended through socket 313, a shoulder 316 will engage the outside surface of socket 313. Pin 311 is attached to a material tab 322 which extends away from the display panel frame as shown in FIG. 5A.

Figures 6A, 6B:
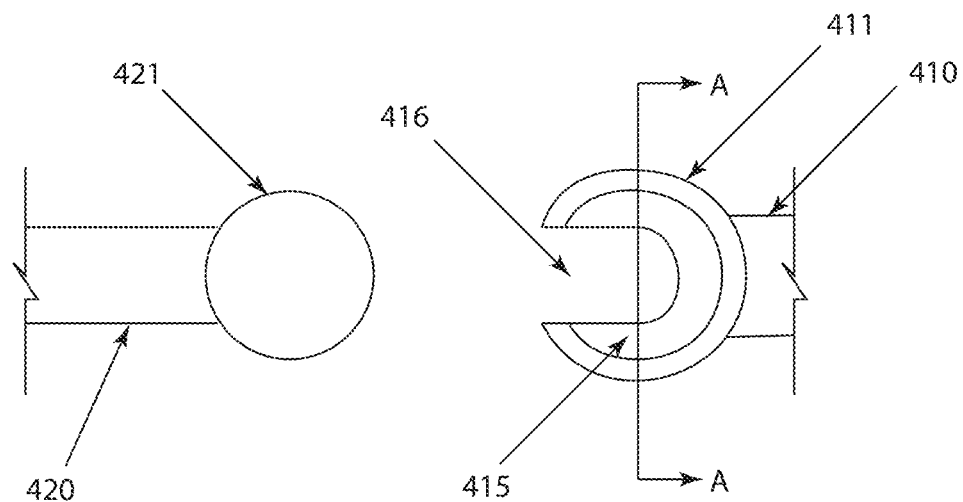
FIG. 6A, is a ball connector.
FIG. 6B, is a socket connector.
Figure 6C:
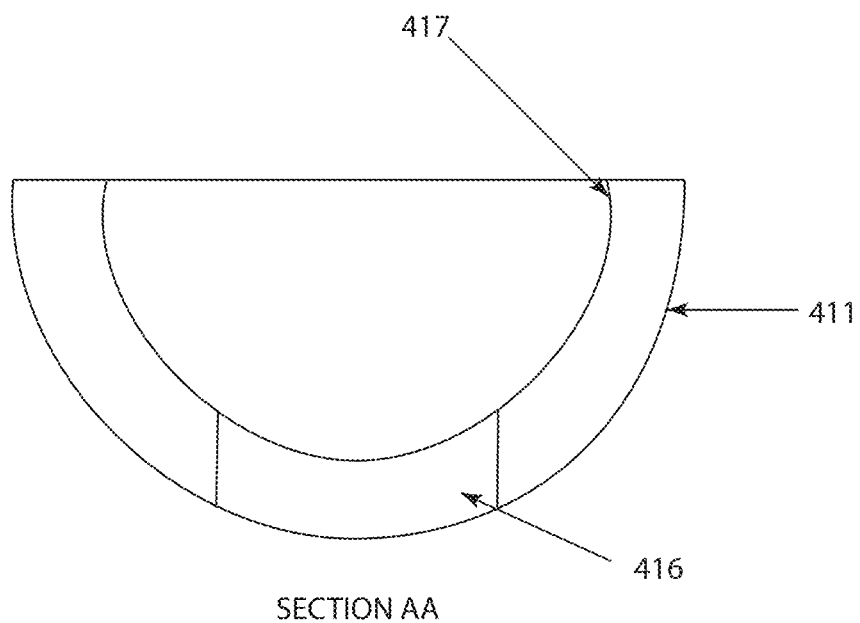
FIG. 6C, is a section view of the socket connector.

FIGS. 6A, 6B and 6C are one embodiment of the interlocking connectors of the present invention including a spherical ball 421, attached to a cantilevered tab 420, and a reciprocal socket 411. The socket 411 attached to the display panel edge using post portion 410. Socket 411 including, a concave portion 415 configured to receive ball 421. A relief slot 416 allows deflection of concave portion 415 when the ball portion 421 is engaged and allows a relief area for post 410 when adjacent display panels are rotated into an angular configuration. As shown in FIG. 6C, the inside lip 417 of socket 415 will overlap the equator of ball 421 to create a secure fit.

Figure 7A:
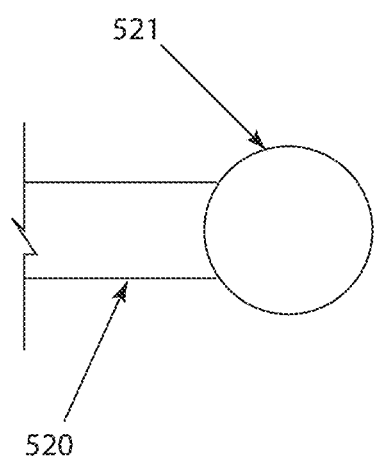
FIG. 7A, is a ball connector of a second embodiment.
Figure 7B:
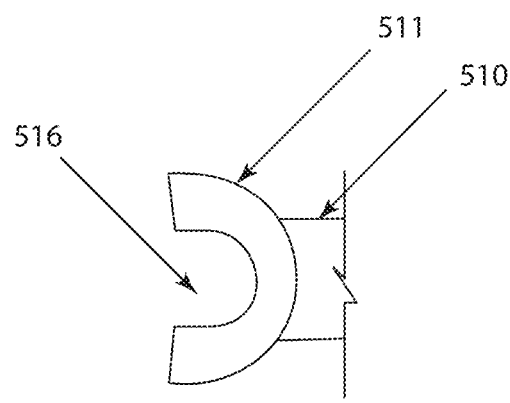
FIG. 7B, is a socket connector of a second embodiment.

FIGS. 7A and 7B are one embodiment of the interlocking connectors of the present invention including a spherical ball 521, attached to a cantilevered post or tab 520, and a reciprocal socket 511. The socket is attached to the display panel edge using the post or tab 510. Relief slots 516 are formed in both the top and bottom portions of the socket 511, allowing the post 520 to move at least 90 degrees perpendicular to the display edge in both a frontward and backward directions.

It is to be understood that the above mentioned arrangements are only illustrative of the application of the principles of the present disclosure. Numerous modifications or alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. An interlocking scintillating display panel comprising;
   a substantially planar frame, comprising opposing top and bottom surfaces, and a plurality of edges extending between, and substantially normal to, the top and bottom surfaces;
   a plurality of display element posts extending outwardly from the top surface of the frame in a uniform pattern;
   a plurality of planar display elements, each attached to a respective one of the plurality of display element posts such that a uniform spacing exists between adjacent planar display elements; and
   a frame interlocking assembly, including reciprocal sets of engagement elements extending outwardly from each edge of the frame, wherein the engagement elements comprise:
   a pin, and
   a socket configured to lockingly engage with the pin.

2. The interlocking scintillating display panel of claim 1 wherein the pin and socket are cylindrical.

3. The interlocking scintillating display panel of claim 1 wherein the socket has a tapered inside surface and the pin has a tapered frustoconical shape proportional to the inside surface of the socket.

4. The interlocking scintillating display panel of claim 1 wherein the pin and socket create an interlocking mechanical engagement.

5. The interlocking scintillating display panel of claim 4 wherein
   the socket has a diameter and a depth,
   the pin having has an attachment end and a free end, the attachment end having:
   a post portion having a length longer than the socket depth, the post portion having a diameter smaller than that of the socket,
   a tapered head attached to the free end, the tapered head forming a shoulder at a junction with the post portion, the tapered head having a base diameter larger than the socket diameter and a free end diameter smaller than the socket diameter, and
   a relief slot formed in the middle of the pin extending lengthwise from the free end to the attachment end, the relief slot configured to allow the base diameter of the tapered head to be pressed through the socket and expand, creating a mechanical engagement between the socket and the shoulder of the tapered head.

6. The interlocking scintillating display panel of claim 5 wherein the mechanical engagement is releasable.

* * * * *